Figure 1:
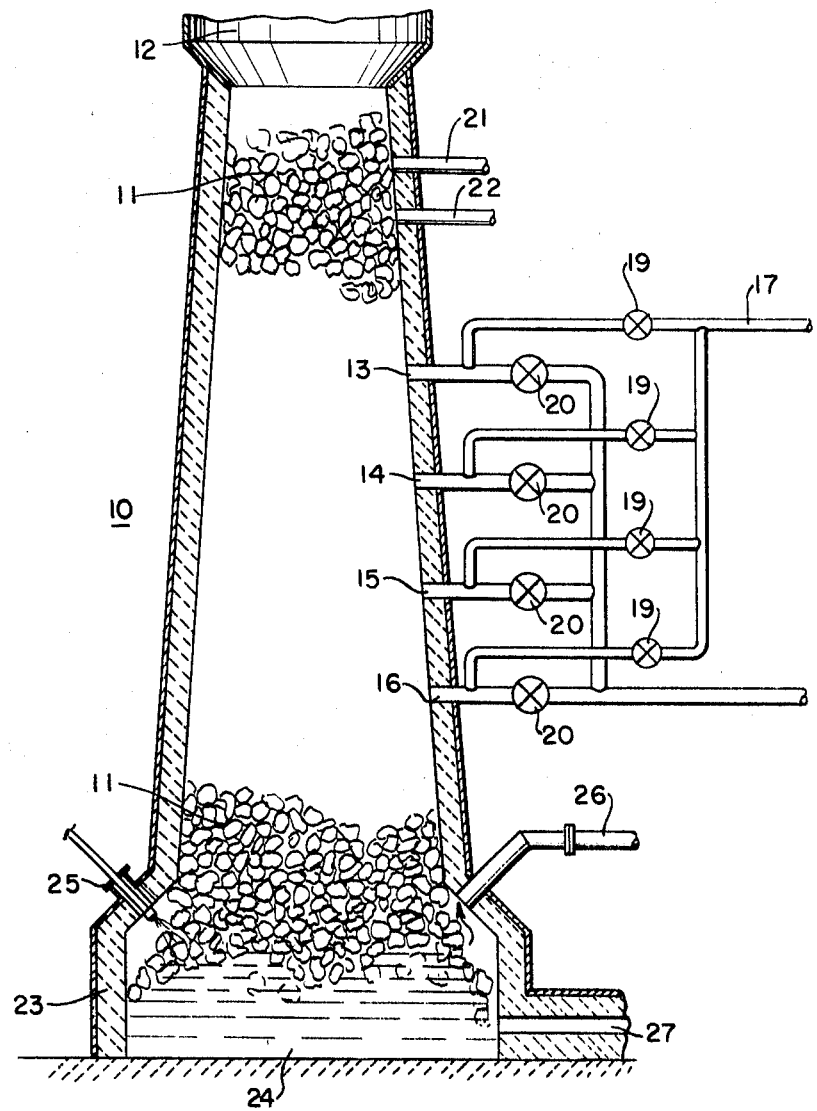

United States Patent

[11] 3,589,698

[72] Inventors John Happel
69 Tompkins Ave., Hastings-on-Hudson, N.Y. 10706;
Joachim Hillard Blanck, 260-16 69th Ave., Glen Oaks, N.Y. 11004
[21] Appl. No. 858,903
[22] Filed July 31, 1969
Division of Ser. No. 468,864, July 1965, abandoned.
[45] Patented June 29, 1971

[54] DIRECT GASEOUS REDUCTION OF IRON OXIDE
7 Claims, 2 Drawing Figs.
[52] U.S. Cl. .................................................. 266/29, 75/34, 75/38
[51] Int. Cl. ......................................................... F27b 17/00
[50] Field of Search ............................................ 266/24, 25, 29, 30

[56] References Cited
UNITED STATES PATENTS

| | | | |
|---|---|---|---|
| 414,654 | 11/1889 | McCarty ...................... | 266/29 |
| 2,577,730 | 12/1951 | Benedict et al. .............. | 75/34 |
| 2,681,854 | 6/1954 | Kautz .......................... | 75/38 |
| 2,952,533 | 9/1960 | Cuscoleca et al. ........... | 75/41 |

*Primary Examiner*—Gerald A. Dost
*Attorney*—Pennie, Edmonds, Morton, Taylor and Adams ABSTRACT: Apparatus for the direct gaseous reduction of molten iron from iron ore comprising a vertical shaft furnace having means for supplying gaseous mixtures of CO and $H_2$ to specified portions of said furnace, means to adjust the gaseous mixture of CO and $H_2$, a melting hearth connected to the outlet of said furnace having means for withdrawing exhaust gas from the hearth, and means for preventing said exhaust gas from entering said furnace.

INVENTORS
JOHN HAPPEL
J. HILLARD BLANCK

BY

Burnie, Edmonds, Morton, Taylor
& Adams
ATTORNEYS

DIRECT GASEOUS REDUCTION OF IRON OXIDE

This is a divisional application of my copending application, Ser. No. 468,864, filed July 1, 1965, and now abandoned.

DIRECT GASEOUS REDUCTION OF IRON OXIDE

This invention relates to the production of molten iron from iron oxide and, more particularly, to a direct gaseous reduction process using a gas mixture containing carbon monoxide and hydrogen to reduce the iron ore or other iron oxides and subsequently to recover the reduced product in its molten state. This invention also relates to an apparatus suitable for carrying out the process of this invention.

Reducing gases, such as carbon monoxide, hydrogen, and natural gases, have been used as chemical reactants for the reduction of iron ores, particularly for the production of sponge irons. The methods that utilize these gases for the reduction of iron ores have not received wide commercial acceptance. Their failure may be attributed to the high production cost and low quality of the products. However, because of the growing scarcity of high-grade coking coal and the relatively low capital investment required, as compared to the conventional blast furnace process, these gas reduction processes remain attractive in certain localities where there are abundant resources of high-grade iron ore, but lacking in capital investment and coking coal.

Heretofore, gaseous reduction is used predominantly in sponge iron processes in which the reduced product is directly recovered from the reduction furnace as hot reactive porous solids. Handling the hot sponge iron creates numerous technical and operational difficulties. Unless a special procedure is used, some degree of reoxidation usually occurs. Except for uses in a few metallurgical processes, sponge iron, which contains a liberal amount of iron oxides and impurities, must be further refined to iron or steel before it has other commercial utilities. Generally, the sponge iron, which melts slowly, is pressed into compact masses, pigs, or briquettes and adjusted to low sulfur and phosphate content before it is charged into a melting furnace for additional refining. Technical difficulties in handling the product and the additional refining required tend to increase the production costs and lower the commercial value of sponge iron. Presently, sponge iron commands a market value only that of the scrap iron.

More recently, attempts have been made to eliminate the elaborate operational procedures for the gaseous reduction processes by directly charging the reduced product into an electric furnace for melting. This type of a process, while it eliminates some problems in handling the hot reactive sponge iron and conserve heat, is not commercially attractive unless very low cost electricity is available. The incompletely reduced products require that the bulk of reduction be carried out in the electric furnace which severely taxes the furnace capacity and severely increases the consumption of electric power.

It is, therefore, the principal object of this invention to overcome the disadvantages stated hereinabove by providing a direct gaseous reduction process which utilizes a gaseous mixture containing hydrogen and carbon monoxide to reduce iron ore or other iron oxides. Preferably the reduced product is subsequently recovered in a molten state. Broadly stated, the process of this invention comprises feeding the iron oxide progressively to the reduction zone and simultaneously subjecting it to the reduction action of a gas mixture comprising $H_2$ and CO. The hydrogen and carbon monoxide gas mixture is adjusted to provide in the first section of the reduction zone a carbon monoxide rich gas mixture having a volume ratio of $H_2$ and CO sufficient to maintain the reduction in an adiabatic reaction while maintaining substantially the same reaction temperature and in a second section adjacent to the outlet of the reduction zone an $H_2$ rich gas mixture to reduce substantially completely the iron oxide to metallic iron. Preferably the resultant product is immediately discharged to a pool of molten iron and necessary heat is supplied to maintain the pool of iron in a molten state.

Advantageously, the process is carried out in a vertical shaft furnace having an inlet at its top for the loading of the ore and an outlet at its bottom for discharging the ore. Gas inlets are disposed along the vertical length of the furnace for supplying a gas mixture containing carbon monoxide and hydrogen to the furnace to effect the reduction of the ore contained therein. There are means for adjusting the gas mixture to provide in a major portion of the furnace a carbon monoxide rich gas mixture having a carbon and hydrogen volume ratio sufficient to maintain an adiabatic reaction of the iron ore while maintaining substantially the same reaction temperature and a hydrogen rich gas mixture at the lower portion of the furnace to effect substantially completely the reduction of the ore to its metallic state. In the preferred embodiment of this invention, an ore melting hearth is connected to the outlet of the furnace to receive the discharge from the furnace. The hearth has at least one burner which is used to provide additional heat for melting the charge, and an outlet for removing the molten product, and a gas outlet for withdrawing the exhaust gas in the hearth. Means are also provided for preventing the exhaust gas in the hearth to enter into the reducing zone.

The iron ores used in this invention preferably are the type which will contain a high percentage of iron oxides, and a low percentage of slag concentrates, and the crushed ore is in lump form. We found iron ores that contain at least 67 percent iron and less than 1 percent siliceous compounds to be eminently suitable. Naturally occurring ores of this type are available in many localities. Large deposits of suitable iron ores are currently found in Brazil and Baffin Land.

In carrying out the process of this invention, the charged stock for the reduction process is preferably preheated to a temperature below the fusion temperature of the ore which is generally below about 1,100°C. Advantageously, the preheating operation is conducted immediately above the reduction zone by burning the partially spent reduction gas mixture. When the reduction process is performed in a vertical furnace, for example, injection of air at the upper portion of the furnace will allow the combustion of the hot and partially spent reduction gas mixture and simultaneously preheats the cold ore.

In the reduction zone, the preheated ore is reduced by a gas mixture containing hydrogen and carbon monoxide. The reduction reaction between the reduction gases and iron ores is complex. Analysis indicates that the overall reactions of hydrogen and iron oxides are endothermic and those of carbon monoxide and iron oxides are exothermic. Using a gaseous mixture containing a proper volume ratio of hydrogen and carbon monoxide, therefore, will provide an isothermal or nearly isothermal mode of reduction operation which will substantially eliminate the necessity for supplying or removing additional heat during the reduction process. The exact gas composition that will effect an adiabatic reaction without substantial increase or decrease of the reaction temperature depends on a number of factors, such as the size of the equipment, physical and chemical properties of the ore, reaction rate, temperature, etc. We found that for a substantially adiabatic and isothermal mode of reduction of high-grade iron ore, the volume ratio of hydrogen and carbon monoxide in a gaseous mixture can be varied within the range of 0.3 to about 0.6.

By establishing a substantially adiabatic and isothermal mode of reaction, we found that the process of this invention overcomes a number of technical difficulties that have contributed to the failure of numerous prior attempts to develop a gaseous reduction process. Essentially, when the reduction reaction is endothermic or exothermic, heat must be added or removed during the process. Poor heat transfers in a large bed of ore prevent effective addition or removal of heat which leads to uneven heat distribution and creates local hot and cold spots in the furnace. When the temperature in the hot spots is too high, fusion of the ore will occur leading to agglomeration, incomplete reduction and lower furnace capacity. On the other hand, when the temperature in the cold spot is too low, the reduction reaction will proceed too slow for a complete reduction of iron oxides. A similar result of poor quality product and small furnace capacity prevails. Using a substantially adiabatic and isothermal mode of reaction, this invention eliminates the requirement for the installation of heating or cooling department in the reduction furnace.

As the reduction of iron oxides proceeds, the formation of a metal layer on the surface of the oxide lumps and other factors tend to gradually lower the reaction rate. The gaseous mixture for the adiabatic and substantially isothermal reaction, which is essentially a carbon monoxide rich gaseous mixture, can no longer provide the required reaction rate for the reduction of iron oxides in a reasonable size reduction furnace and at a reasonable furnace holding time. Advantageously, the gaseous mixture rich in CO is replaced by a more effective CO and $H_2$ reducing gaseous mixture which is rich in $H_2$. Operating at a temperature below the fusion of iron oxides, we found the optimum gas mixture that will provide the most effective and rapid reduction has a volume ratio of $H_2$ to CO in the range from about 1 to about 20.

Figure 2:
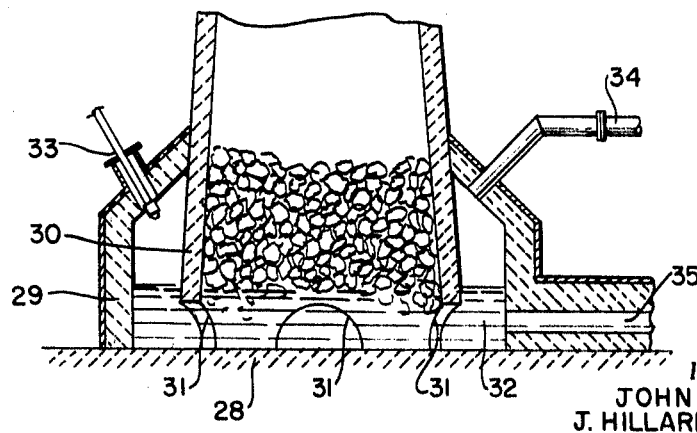

Further to illustrate this invention, specific embodiments and examples are described hereinbelow with reference to the accompanying drawing wherein FIG. 1 is a schematic drawing of a cross section of an apparatus of this invention, and FIG. 2 is a fragmentary section showing the lower portion of a second embodiment of this invention.

To carry out the process of this invention, using the apparatus shown in FIG. 1, a suitable high-grade lump ore is first crushed to a maximum diameter less than 2-½ inches. Although there is no critical limitation about the sizes of the ore, generally it is more economical to use sizes less than 2-½ inches because reduction rates are much slower for larger sizes. Excess reduction of the sizes of the ore, however, it not warranted because of the increased tendency for the ore to form undesirable lines. A charge stock comprising lumps in the average diameter of three-fourths inch to 1 inch is suitable. The properly prepared stock is then charged into the vertical shaft furnace 10 to form a descending bed of iron ore 11. Loading of the furnace is facilitated by hopper 12 provided at its top. The hopper 12 is preferably equipped with a valve (not shown in FIG. 1) to control the feed of the charge stock to the shaft. After initial loading, the valve is opened periodically to fill the descending bed of ore in the shaft during the regular run.

The reducing gases for the deoxidation of the iron ore are introduced into the furnace by as inlets 13, 14, 15, and 16 which are arranged along the vertical length of the gas furnace. Each of these gas inlets is connected to carbon monoxide and hydrogen supply sources by pipes 17 and 18, respectively. The volume ratio of carbon monoxide and hydrogen in the gaseous mixture is adjusted by valves 19 and 20.

While the gases supplied to the gas inlets by pipes 17 and 18 may be pure hydrogen and carbon monoxide, in practice it is more convenient and economical to deliver separately a carbon monoxide rich gaseous mixture and a hydrogen rich gaseous mixture generated from solid carbonaceous fuels, petroleum, or natural gases. The specific choice of gases would largely depend on the availability of the fuels at the plant site. For example, pipe 17 may be supplied with a gaseous mixture from partial combustion of carbonaceous fuel, such as coke, coal, or lignite to give a gas rich in carbon monoxide. Injection of water further converts C to CO and $H_2$. The resultant carbon monoxide to hydrogen ratio is of the order of 3. Pipe 18 may be supplied by a gas mixture produced by utilizing the water-gas reaction of contacting hot carbon with steam to give a gas rich in hydrogen with a CO to $H_2$ ratio of about 1. When petroleum or natural gases are readily available, a simple process employing partial combustion of the fuel may be used. Essentially, this process consists of burning the fuel incompletely to produce a mixture of carbon monoxide and hydrogen.

Before the ore is introduced into the reduction zone of the furnace, it is preferably preheated to the reduction temperature. The preheating operation is carried out conveniently by the combustion of the partially spent reducing gases. Air inlet 21, located above the reduction zone, is used to supply the necessary oxygen for the combustion. Air fed to the furnace also is preferably preheated to give maximum thermal efficiency. Depending on the thermal properties of the ore, and the heating value of the spent reducing gas, the preheating step may use more than one-third of the total amount of spent reducing gases to raise the temperature of the ore to above about 1,000° C. The excess spent reducing gases not required for the preheating operation are withdrawn from the furnace through gas outlet 22 located below the air inlet. The gases withdrawn are reprocessed to remove water and carbon dioxide and are subsequently recycled. The combustion exhaust is removed by a vent (not shown).

The preheating step brings the ore to the proper reduction temperature so that adiabatic reduction of the ore can proceed immediately when the ore reaches the reduction zone. The temperature of the ore after preheating, hence the temperature for the adiabatic and substantially isothermal mode of reaction, can be as low as 800° C. However, the dependency of the reduction rate and the percentage of deoxidation on the temperature suggest the use of a maximum allowable temperature. The upper temperature limit for the reduction therefore is just below the sintering or the fusing temperature of the ore. A temperature about 1,100° C. for a high-grade iron ore is found to be eminently suitable.

Because of the large number of variables and the complexities of the reactions between iron oxides and reducing gases CO and $H_2$, selection of the proper gaseous compositions used in the reduction zone must be determined separately for each individual operation. From our study, we find it is advantageous to use a reducing gaseous mixture richer in carbon monoxide in the initial stage of the reduction. The mixture can be progressively leaner in carbon monoxide as the reduction progresses. The plurality of gas inlets 13 to 16 arranged along the vertical length of the furnace effectively provides the required varying gaseous compositions in the furnace. The volume ratio of hydrogen and carbon monoxide for the CO rich gaseous mixture, as stated previously, may vary in the range from about 0.3 to about 0.6. For example, in reducing a high-grade iron ore, which can be considered to consist essentially of hematite and magnetite, a gaseous mixture consisting of 73 percent carbon monoxide and 27 percent hydrogen provides an isothermal operation at 1,000° C. in an adiabatic reduction process for the initial one-third length of the reduction zone. If this gaseous mixture were to be used for the remainder length of the reduction zone, an exothermic reaction would prevail. Therefore, to maintain an isothermal adiabatic reaction, a composition leaner in CO content can be used.

This finding is especially significant in the process of this invention because of the particular nature of the CO-$H_2$ mixture in the reduction process. It is known that a mixture of CO and $H_2$ is more effective than if CO OR $H_2$ were used alone in the reduction of iron oxides. However, the optimal CO and $H_2$ mixture that provides the most effective reduction of iron oxide in terms of reduction rate and percentage of deoxidation has a higher hydrogen content than the isothermal adiabatic composition. For example, only 46 percent of deoxidation is observed when magnetite is reduced at 1,000° C. by 100 percent carbon monoxide for 2 hours. Under similar conditions, a 50 percent CO-50 percent $H_2$ mixture provides 88 percent deoxidation. As the hydrogen content increases, the percentage of deoxidation rises until it reaches an optimal composition, which is found to be 75 percent $H_2$ and 25 percent CO. Further increase of $H_2$ content lowers the effectiveness of the CO-$H_2$ mixture. At 1,100° C., the optimal composition is found to be 90 percent $H_2$ and 10 percent CO. Similarly, optimal gaseous mixtures can be obtained for other iron ores at different operating conditions. Generally, for high-grade iron ore, a CO-$H_2$ mixture containing hydrogen in the range from 50 percent $H_2$ to 95 percent $H_2$ is found to be most effective at the optimal temperature range. In selecting a gas composition that will provide the most effective reduction of the iron ore, the endothermic and exothermic relationship established between $H_2$ and CO must be taken into consideration so the mixture used will not create a sudden drop of temperature in the reduction zone when the gas compositions change from CO rich to $H_2$ rich mixtures.

In practice, a clear separation between CO rich and $H_2$ rich sections in the reduction zone cannot be established. However, by feeding the gas inlet 13 with a substantially CO rich gas mixture, gas inlet 16 with a substantially hydrogen rich mixture and the intermediate gas inlets 14 and 15 with a gaseous mixture for maintaining an isothermal adiabatic reduction, an effective gaseous atmosphere can be established within the furnace for the most efficient reduction of iron ore heretofore realized.

Subsequent to reduction, the product is in the form of sponge iron. Preferably, the reduced product from the furnace 10 is discharged directly to a melting hearth 23 connected to the outlet of the furnace and into a pool of molten metal 24. Since the reduction is carried out at a temperature just below the melting point of the iron, only a relatively small amount of additional heat is needed to melt the reduced ore. The required heat is supplied conveniently by burner 25 which may burn pulverized solid carbonaceous fuel, petroleum, or natural gases. Other heating means may also be used to supply the necessary heat. The furnace is maintained preferably at a slightly higher pressure than the pressure of the hearth to create a pressure leg between the furnace and the hearth to avoid contamination of the reducing atmosphere. The higher pressure in the furnace allows the exhaust from burner 25 and a small amount of escaped reducing gases to be removed through outlet 26. The molten iron is drained from outlet 27 for casting. The quality of the iron from the process of this invention depends on the grade of the iron ore used. For a high-grade iron ore, the iron has a composition approaching that of steel. A specific example showing the initial chemical analysis of a high-grade iron ore separated into hematite and magnetite and the final composition of the reduced products is shown in tables I and II:

TABLE I

| Component | Hematite | Magnetite |
|---|---|---|
| Total iron | 70.12 | 70.20 |
| FeO | 3.71 | 12.11 |
| $SiO_2$ | 0.36 | 0.14 |
| $Al_2O_3$ | 0.14 | 0.15 |
| CaO | 0.10 | 0.31 |
| MgO | 0.25 | 0.06 |
| MnO | 0.10 | 0.25 |
| $TiO_2$ | 0.16 | 0.014 |
| S | 0.007 | 0.021 |
| P | 0.039 | 0.64 |
| $CO_2$ | 0.98 | 2.87 |
| Gain on ignition | 0.32 | |

TABLE II

| Component | Metallized hematite | Metallized magnetite |
|---|---|---|
| Total iron | 99.31 | 99.36 |
| Metallic iron | 96.41 | 98.17 |
| $SiO_2$ | 0.26 | 0.41 |
| $Al_2O_3$ | 0.09 | 0.10 |
| CaO | Trace | Trace |
| MgO | Trace | Trace |
| MnO | 0.14 | 0.08 |
| $TiO_2$ | 0.14 | 0.03 |
| S | 0.046 | 0.051 |
| P | 0.003 | 0.006 |
| Carbon | Nil | Nil |

Alternatively, the exhaust can be prevented from entering the furnace by the arrangement shown in FIG. 2. In this arrangement, the shaft furnace 10 is extended to the base 28 of the melting hearth 29 to form a skirt 30. Openings 31 are provided at the skirt below the liquid line of the molten metal 32 to create an effective hydraulic seal to prevent the exhaust generated by burner 33 to enter into the furnace. The exhaust from the burner is established through gas outlet 34. Similar to the arrangement shown in FIG. 1, the molten iron is drawn from outlet 35 for casting.

We claim:

1. An apparatus for the production of molten iron from iron ore using a gaseous mixture containing $H_2$ and CO for the reduction of said ore to metallic iron, the apparatus comprising:
    a. a vertical shaft furnace having an inlet at its top for the loading of said ore and an outlet at its bottom for discharging said metallic iron,
    b. gas inlets disposed along the vertical length of the furnace for supplying a gaseous mixture containing CO and $H_2$ to said furnace to effect the reduction of said ore contained therein,
    c. means for adjusting said gaseous mixture to provide at the major portion of said furnace a CO rich gaseous mixture having a CO and $H_2$ volume ratio sufficient to maintain substantially an adiabatic reduction of said ore while maintaining substantially the same reaction temperature and a hydrogen rich gaseous mixture at the lower portion of said furnace to effect substantially completely the reduction of said ore to its metallic state,
    d. an ore melting hearth directly connected to the outlet of said furnace to receive the discharge from said furnace and forming an integral part of said furnace, said hearth having at least one burner used to provide the necessary heat for removing the molten product and a gas outlet for withdrawing the exhaust gas in the hearth, and
    e. means for preventing said exhaust gas from entering said furnace.

2. An apparatus for the production of molten iron from iron ore using a gaseous mixture containing $H_2$ and CO for the reduction of said ore to metallic iron, the apparatus comprising:
    a. a vertical shaft furnace having an inlet at its top for the loading of said ore and an outlet at its bottom for discharging said metallic iron,
    b. gas inlets disposed along the vertical length of the furnace for supplying gaseous mixtures containing CO and $H_2$ to said furnace to effect the reduction of said ore contained therein,
    c. means for supplying an oxygen containing gas above said gas inlets for the combustion of said gas mixtures to preheat the ore entering from the top of the furnace,
    d. means for adjusting said gas mixture to provide at the major portion of said furnace a CO rich gaseous mixture having a CO and $H_2$ volume ratio sufficient to maintain substantially an adiabatic reduction of said ore while maintaining substantially the same reaction temperature and a hydrogen rich gaseous mixture at the lower portion of said furnace to effect substantially completely the reduction of said ore to its metallic state,
    e. an ore melting hearth directly connected to the outlet of said furnace to receive the discharge from said furnace and forming an integral part of said furnace, said hearth having at least one burner used to provide the necessary heat for removing the molten product and a gas outlet for withdrawing the exhaust gas in the hearth, and
    f. means for preventing said exhaust gas from entering said furnace.

3. An apparatus as in claim 2 in which the means for maintaining said exhaust gas from entering said furnace is a pressure leg at the lower portion of the furnace adjacent to the hearth, the pressure leg being the result of higher pressure maintained in the furnace.

4. An apparatus as in claim 3 wherein a gas outlet is provided at the upper portion of the furnace between the gas inlets and the oxygen supplying means, said gas outlet being used for withdrawing the spent CO and $H_2$ gaseous mixture for reprocessing to recover CO and $H_2$ contained therein.

5. An apparatus for the production of molten iron from iron ore using a gaseous mixture containing $H_2$ and CO for the reduction of said ore to metallic iron, the apparatus comprising:
    a. a vertical shaft furnace having an inlet at its top for loading of said ore and an outlet at its bottom for discharging said metallic iron, b. gas inlets disposed along the vertical length of the furnace for supplying gaseous mixtures containing CO and $H_2$ to said furnace to effect the reduction of said ore contained therein, c. means for supplying an oxygen containing gas above said gas inlets for the combustion of said gaseous mixtures to preheat the ore entering from the top of the furnace, d. means for adjusting said gaseous mixture to provide at the major portion of said furnace a CO rich gaseous mixture having a CO and $H_2$ volume ratio sufficient to maintain substantially an adiabatic reduction of said ore while maintaining substantially the same temperature and a hydrogen rich gaseous mixture at the lower portion of said furnace to effect substantially completely the reduction of said ore to its metallic state, and e. an ore melting hearth directly surrounding the lower portion of the furnace for receiving and melting the discharge from said furnace, said hearth having at least one burner used to provide the necessary heat for melting said charge, an outlet for removing the molten product and a gas outlet for withdrawing the exhaust gas in the hearth, the furnace outlet extending below the melt in the hearth forming a hydraulic seal preventing the exhaust in the hearth to enter the furnace.

6. An apparatus as in claim 5 wherein a gas outlet is provided at the upper portion of the furnace between the gas inlet and the oxygen supplying means, said gas outlet being used for withdrawing the spent CO and $H_2$ gaseous mixture for reprocessing to recover CO and $H_2$ contained therein.

7. An apparatus as in claim 5 in which the furnace is supported by the foundation of the hearth and there are openings at the lower portion of the furnace below the melt to allow the communication of the reduced ore with the melt and simultaneously to provide a hydraulic seal preventing the exhaust of the hearth to enter said furnace.

UNITED STATES PATENT OFFICE
CERTIFICATE OF CORRECTION

PO-1050 (5/69)

Patent No. 3,589,698    Dated June 29, 1971

Inventor(s) John Happel and Joachim H. Blanck

It is certified that error appears in the above-identified patent and that said Letters Patent are hereby corrected as shown below:

In the Specification

Column 3, line 4,

"department" should be --equipment--

Column 3, line 33,

"it" should be --is--

Column 3, line 35,

"lines" should be --fines--

Column 3, line 46,

"as inlets" should be --gas inlets--

Column 4, line 56,

"OR" should be --or--

Column 5, line 45

(under "Magnetite") "70.20" should be --72.20--

Signed and sealed this 8th day of February 1972.

(SEAL)
Attest:

EDWARD M. FLETCHER, JR.
Attesting Officer

ROBERT GOTTSCHALK
Commissioner of Patents